United States Patent
Li et al.

(10) Patent No.: US 11,641,127 B2
(45) Date of Patent: May 2, 2023

(54) METHOD AND APPARATUS FOR ADAPTIVE FEEDFORWARD CORRECTION OF OUTPUT CURRENT RIPPLE IN AN ON-BOARD CHARGING SYSTEM

(71) Applicant: Vitesco Technologies USA, LLC, Auburn Hills, MI (US)

(72) Inventors: Michael J Li, Troy, MI (US); Mikhail Zarkhin, West Bloomfield, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 189 days.

(21) Appl. No.: 17/019,515

(22) Filed: Sep. 14, 2020

(65) Prior Publication Data

US 2022/0085643 A1    Mar. 17, 2022

(51) Int. Cl.
| | |
|---|---|
| H02J 7/00 | (2006.01) |
| H02J 7/06 | (2006.01) |
| H02J 7/34 | (2006.01) |
| H02M 1/14 | (2006.01) |
| H02M 1/42 | (2007.01) |
| H02M 3/156 | (2006.01) |

(52) U.S. Cl.
CPC .............. *H02J 7/06* (2013.01); *H02J 7/0013* (2013.01); *H02J 7/345* (2013.01); *H02M 1/14* (2013.01); *H02J 7/00714* (2020.01); *H02J 2207/20* (2020.01); *H02J 2207/50* (2020.01); *H02M 1/4208* (2013.01); *H02M 3/156* (2013.01)

(58) Field of Classification Search
USPC ....................................................... 320/163
See application file for complete search history.

(56) References Cited

U.S. PATENT DOCUMENTS

| | | | |
|---|---|---|---|
| 11,271,473 B2* | 3/2022 | Martinez Perez | H02M 1/4208 |
| 2006/0126367 A1* | 6/2006 | Hesterman | H02M 5/458 |
| | | | 363/89 |
| 2006/0176948 A1* | 8/2006 | Lee | H04L 25/03057 |
| | | | 375/233 |
| 2014/0125306 A1 | 5/2014 | Babazadeh et al. | |

FOREIGN PATENT DOCUMENTS

CN        103066827 A    4/2013

OTHER PUBLICATIONS

International Search Report dated Nov. 18, 2021 from corresponding International Patent Application No. PCT/US2021/071259.

* cited by examiner

*Primary Examiner* — Toan T Vu
*Assistant Examiner* — Xuan Ly (57) ABSTRACT

A charging system includes an AC-DC converter for connecting to AC mains; a DC-link connected to the AC-DC converter output; and a DC-DC converter having an input coupled to the AC-DC converter output, a control input, and an output. The DC-DC converter includes drive circuitry for controlling the DC-DC converter. A controller has a feedforward input for receiving a signal corresponding to a voltage across the DC-link, a feedback input for receiving a signal corresponding to an output current provided by the DC-DC converter, and an output coupled to the control input of the DC-DC converter. The controller generates a control signal which controls the drive circuitry based upon a positive half cycle and a negative half cycle of ripple voltage at the DC-link, and a ripple current amplitude at the DC-DC converter output during at least one of the positive half cycle or the negative half cycle.

13 Claims, 7 Drawing Sheets

METHOD AND APPARATUS FOR ADAPTIVE FEEDFORWARD CORRECTION OF OUTPUT CURRENT RIPPLE IN AN ON-BOARD CHARGING SYSTEM

FIELD OF INVENTION

The present invention generally relates to onboard charging for a motor vehicle, and particularly to a vehicle onboard charging method and system in which feedforward control is used to reduce output current ripple.

BACKGROUND

Figure 1:
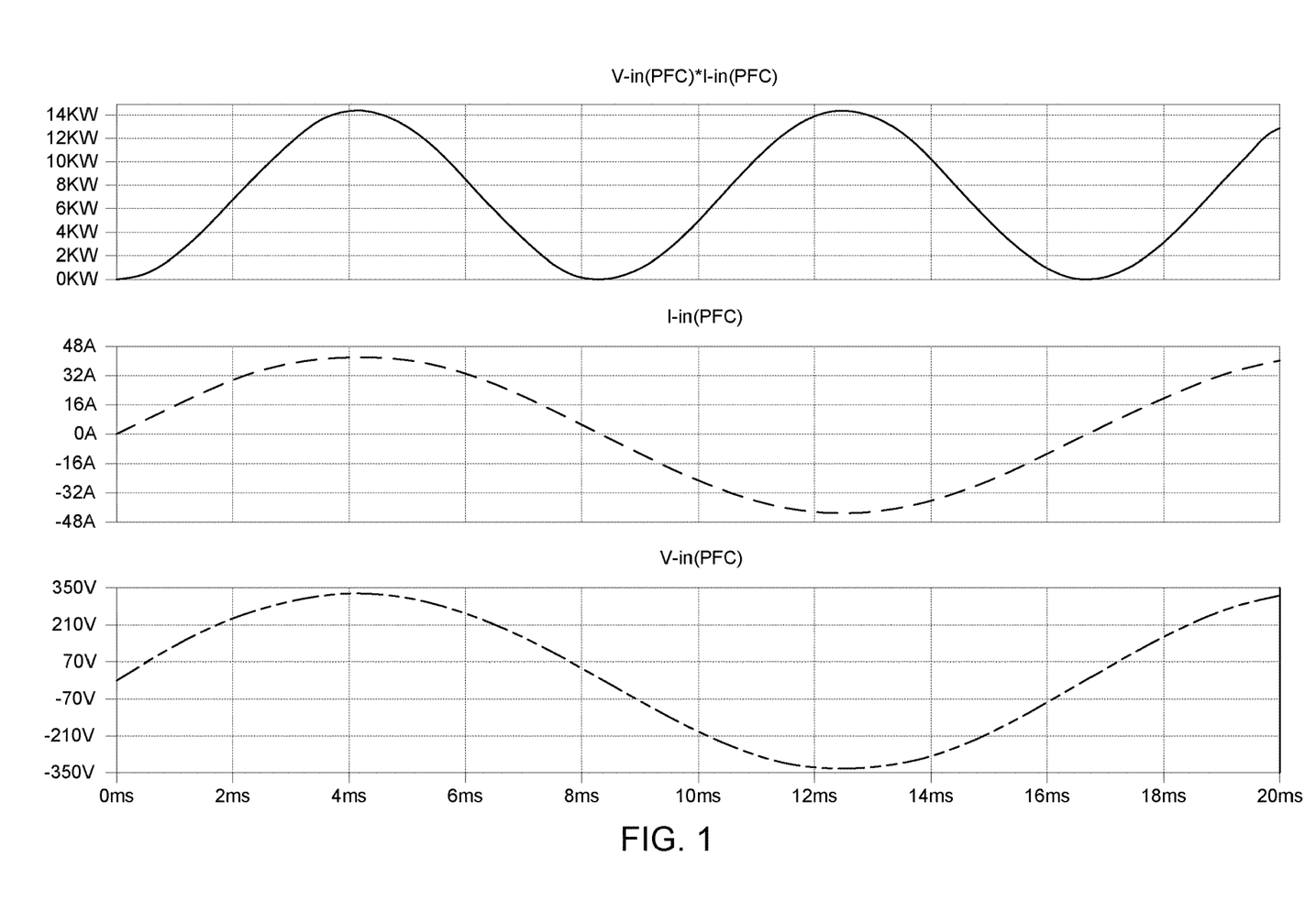
FIG. 1 is a set of waveforms illustrating the relationships between voltage, current and power appearing at the input of a PFC block of an onboard charging system.

Regulatory standards, such as IEC61000-3-2, require devices that draw high power from the AC mains to implement power factor correction (PFC). PFC regulates current draw from the AC mains in proportion to the AC voltage, reducing distortion of the AC sine wave under high load conditions. This necessarily defines input power waveform over time as sinusoidal. FIG. 1 illustrates voltage V, current I and power P at the input of the PFC circuit. However, a DC-DC converter such as one used for an on-board charging application in a motor vehicle requires near constant power output. A common method to buffer the sinusoidal power input for providing a constant power output is to have a large capacitance bank between the PFC and DC-DC stages of an onboard charging system, which is commonly referred to as a DC-Link. The capacitors provide energy storage during the lower input power periods and are recharged in the higher power input power periods of the input power cycle.

Figure 2:
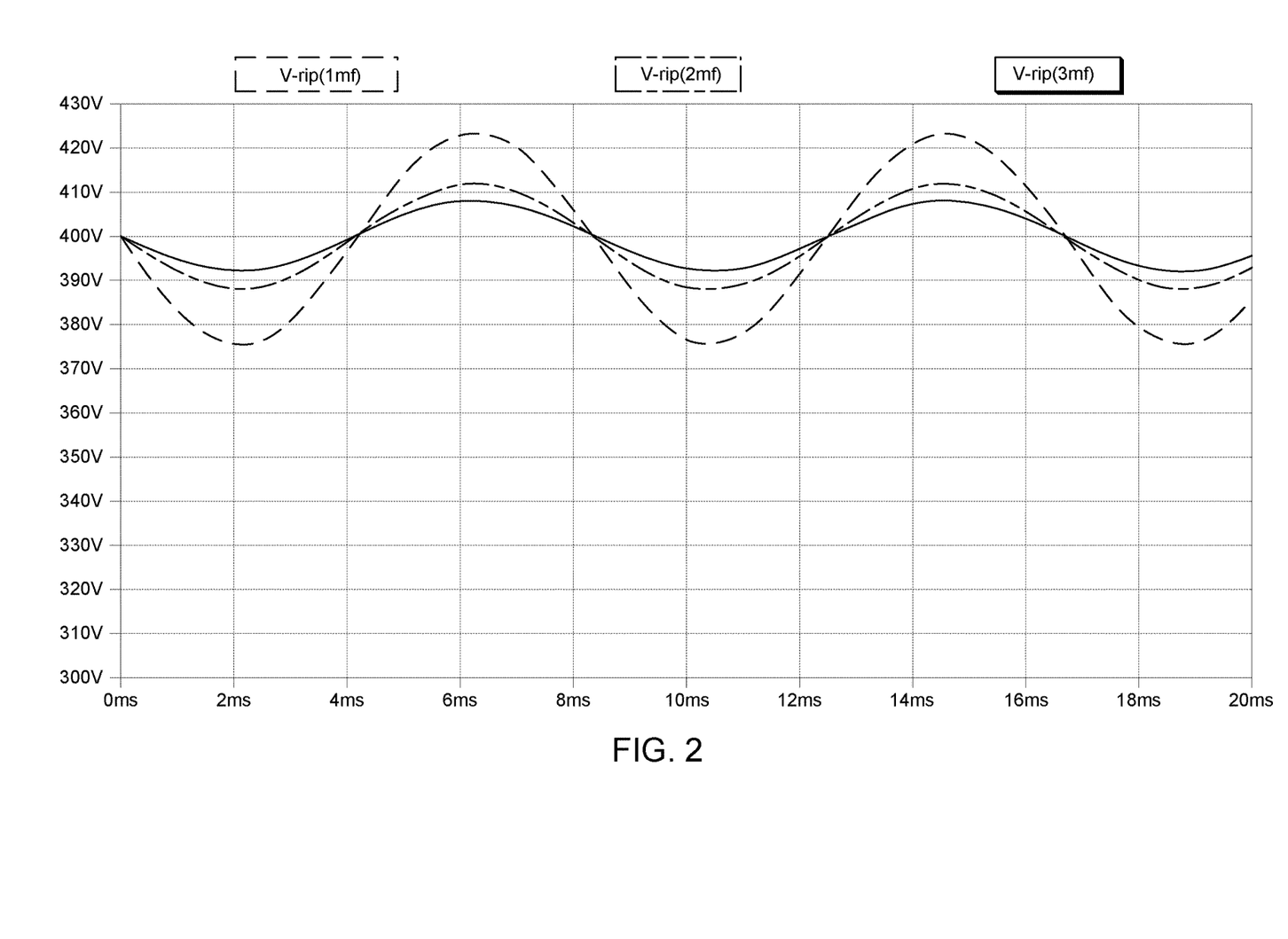
FIG. 2 is a set of waveforms illustrating the effect of capacitance of a DC-link on DC ripple voltage at the link.

To provide a constant voltage at the DC-Link would require infinite capacitance, so in practice some AC ripple will always be present, with the ripple amplitude inversely proportional to the capacitance of the DC-Link. FIG. 2 illustrates voltage ripple at the DC-link for 1 mF, 2 mF and 3 mF of the DC-link. Therefore, the DC-DC converter must also provide ripple rejection within its control loop to attenuate the remaining DC-Link ripple and prevent the ripple from causing excessive output current ripple.

Because high voltage capacitors are both expensive and bulky, it is a competitive advantage to reduce the capacitance value to the minimum or otherwise smallest capacitance possible. This allows a maximum ripple only as restricted by component voltage ratings, not by output current ripple. The DC-DC converter would then reject the remaining voltage ripple with enough attenuation to meet output ripple current requirements.

Implementing a DC-DC converter for an onboard charging system with the adequate attenuation for such DC-Link ripple amplitudes presents challenges to the control design. A control loop design that is both stable and that can achieve the required attenuation of DC-Link ripple may not be possible through traditional closed loop control of the output current.

One technique for improving attenuation is to inject the DC-Link voltage directly into the control using a method commonly known as "feed forward." This method bypasses the inherent delays in the control loop and counteracts output current ripple in proportion to the input voltage. Care must be taken that the coefficient of feedforward control be designed correctly so that exactly the correct amount of correction is applied so that output current ripple is cancelled, but not so much that the output current ripple reverses polarity and increases as a result of overcompensation.

Traditional methods for accomplishing this involve characterization and/or calculation of the correct coefficient value, which is used as a fixed constant in the control design. However, the response of a typical DC-DC converter is often non-linear and may require different coefficients at different operating points (e.g. output voltage). Furthermore, tolerances and drift in components may cause the individual DC-DC converter to deviate from the characterized/calculated model, reducing the effectiveness of feed-forward compensation.

SUMMARY

Example embodiments overcome deficiencies of known onboard charging systems for a vehicle and satisfies a significant need for a charging system and method which effectively reduces or otherwise eliminates output current ripple.

In an example embodiment, a charging system includes an AC-DC converter having input terminals for connecting to AC mains; a DC-link having a terminal connected to an output terminal of the AC-DC converter, the DC-link including at least one capacitor; and a DC-DC converter having an input terminal coupled to the output terminal of the AC-DC converter, a control input terminal, and an output terminal for coupling to a load to be charged. The DC-DC converter includes drive circuitry for controlling the DC-DC converter. A controller having at least one feedforward input terminal is coupled to the DC-link for receiving a signal corresponding to a voltage across the DC-link, at least one feedback input terminal for receiving at least one signal corresponding to an output current provided by the DC-DC converter at the output terminal thereof, and at least one output terminal coupled to the control input terminal of the DC-DC converter. The controller generates a control signal at the at least one output terminal which controls the drive circuitry of the DC-DC converter. The control signal generated by the controller is based upon a positive half cycle and a negative half cycle of ripple voltage at the DC-link, and an amplitude of a ripple current at the output terminal of the DC-DC converter during at least one of the positive half cycle and the negative half cycle.

In one aspect, the controller adjusts the control signal based upon the amplitude of the ripple current at the output terminal of the DC-DC converter during both the positive and negative half cycles of the ripple voltage at the DC-link, for each cycle of the ripple voltage at the DC-link in a plurality of cycles thereof.

In another aspect, the controller determines a plurality of error values associated with the ripple current at the output terminal of the DC-DC converter during the at least one of the positive half cycle or the negative half cycle in each of the plurality of cycles of the ripple voltage at the DC-link, and adjusts a feedforward coefficient based upon the plurality of error values, wherein the control signal generated by the controller is based upon the adjusted feedforward coefficient. Each error value associated with the ripple current at the output terminal of the DC-DC converter is based upon an instantaneous current at the output terminal of the DC-DC converter and a setpoint current value. For each of the at least one of the positive half cycle or the negative half cycle, the controller integrates the error values throughout the at least one of the positive half cycle or the negative half cycle in each of the plurality of cycles.

The controller adjusts the control signal based upon both the positive and negative half cycles of the ripple voltage at the DC-link, for each cycle of the ripple voltage at the DC-link in a plurality of cycles thereof. During the positive half cycle of each of the plurality of cycles, the error value associated with the current ripple at the output terminal of the DC-DC converter includes the instantaneous value of the ripple current at the output terminal of the DC-DC converter less the setpoint current value. During the negative half cycle of each of the plurality of cycles, the error value associated with the current ripple at the output terminal of the DC-DC converter includes the setpoint current value less the instantaneous value of the ripple current at the output terminal of the DC-DC converter.

Based upon the integrated error value, the controller adjusts the feedforward coefficient by adding to or subtracting from a previously adjusted version of the feedforward coefficient.

The controller includes a feedforward path from the DC-link and a feedback path from the output terminal of the DC-DC converter. The feedforward path generates a feedforward control signal, the feedback path generates a feedback control signal, and the control signal is based upon the feedforward control signal and the feedback control signal. The controller combines the feedforward control signal and the feedback control signal to generate a combined control signal. The controller generates the control signal which controls the drive circuitry of the DC-DC converter based upon the combined control signal.

Based upon the combined control signal, the control signal modulates switching frequency, duty cycle or phase shift of switching devices in the drive circuitry.

A method of controlling a DC-DC converter in a charging system including a DC-link coupled to an input of the DC-DC converter includes: receiving a voltage at the DC-link and at least one signal representing current at an output of the DC-DC converter; and determining positive and negative half cycles of a ripple voltage at the DC-link, based upon the received DC-link voltage, for a plurality of cycles of the ripple voltage. The method further includes determining a plurality of error values associated with a ripple current at the output terminal of the DC-DC converter during at least one of a positive half cycle or a negative half cycle in each of the plurality of cycles of the ripple voltage at the DC-link; and adjusting a feedforward coefficient based upon the plurality of error values associated with the ripple current at the output terminal of the DC-DC converter. A control signal is generated based upon the adjusted feedforward coefficient and controlling the DC-DC converter includes using the control signal.

The method further includes, for each of the at least one of the positive half cycle or the negative half cycle, integrating the error value associated with the current ripple at the output terminal of the DC-DC converter throughout the at least one of the positive half cycle or the negative half cycle in each of the plurality of cycles. The error value associated with the current ripple at the output terminal of the DC-DC converter is based upon an instantaneous value of the ripple current at the output terminal of the DC-DC converter and an average current at the output terminal of the DC-DC converter.

Determining a plurality of error values includes determining the plurality of error values associated with a ripple current at the output terminal of the DC-DC converter during each positive half cycle and negative half cycle in each of the plurality of cycles of the ripple voltage at the DC-link. During the positive half cycle of each of the plurality of cycles, the error value associated with the current ripple at the output terminal of the DC-DC converter includes the instantaneous value of the ripple current at the output terminal of the DC-DC converter less the average current. During the negative half cycle of each of the plurality of cycles, the error value associated with the current ripple at the output terminal of the DC-DC converter includes the average current less the instantaneous value of the ripple current at the output terminal of the DC-DC converter.

Adjusting the feedforward coefficient includes adding to or subtracting from a previously adjusted version of the feedforward coefficient with the integrated error value.

The method further includes determining a feedforward control signal based upon the adjusted coefficient, and determining a feedback control signal based upon an electrical characteristic at the output of the DC-DC converter. The control signal is generated based upon the feedforward signal and the feedback control signal.

The control signal modulates a switching frequency, duty cycle or phase shift of switching devices in the drive circuitry.

BRIEF DESCRIPTION OF THE DRAWINGS

Aspects of the invention will be explained in detail below with reference to exemplary embodiments in conjunction with the drawings, in which.

DETAILED DESCRIPTION

The following description of the example embodiment(s) is merely exemplary in nature and is in no way intended to limit the invention, its application, or uses. In the figures and throughout the detailed description, the same reference numbers are used to identify identical or similar elements. For the sake of clarity, the elements are not shown to scale unless otherwise specified.

The example embodiments are generally directed to an apparatus and method which utilizes feedforward control to reduce ripple current appearing at the output of a charging system utilizing a DC-DC converter, such as an onboard charging (OBC) system for a motor vehicle. The apparatus adaptively changes at least one feed forward coefficient by measuring and processing the output current of the DC-DC converter and comparing its phase relationship to the input ripple voltage of the DC-DC converter. The apparatus continuously updates the feedforward coefficient towards an ideal value or range thereof. The required inputs to the proposed feedforward control scheme, namely the DC-Link voltage and output current of the DC-DC converter, are already available in OBC systems and therefore no, or minimal, additional hardware is required. The measurement and processing of the current signal at the output of the DC-DC converter is also straightforward and not processor intensive and therefore has very low implementation cost.

Figure 3:
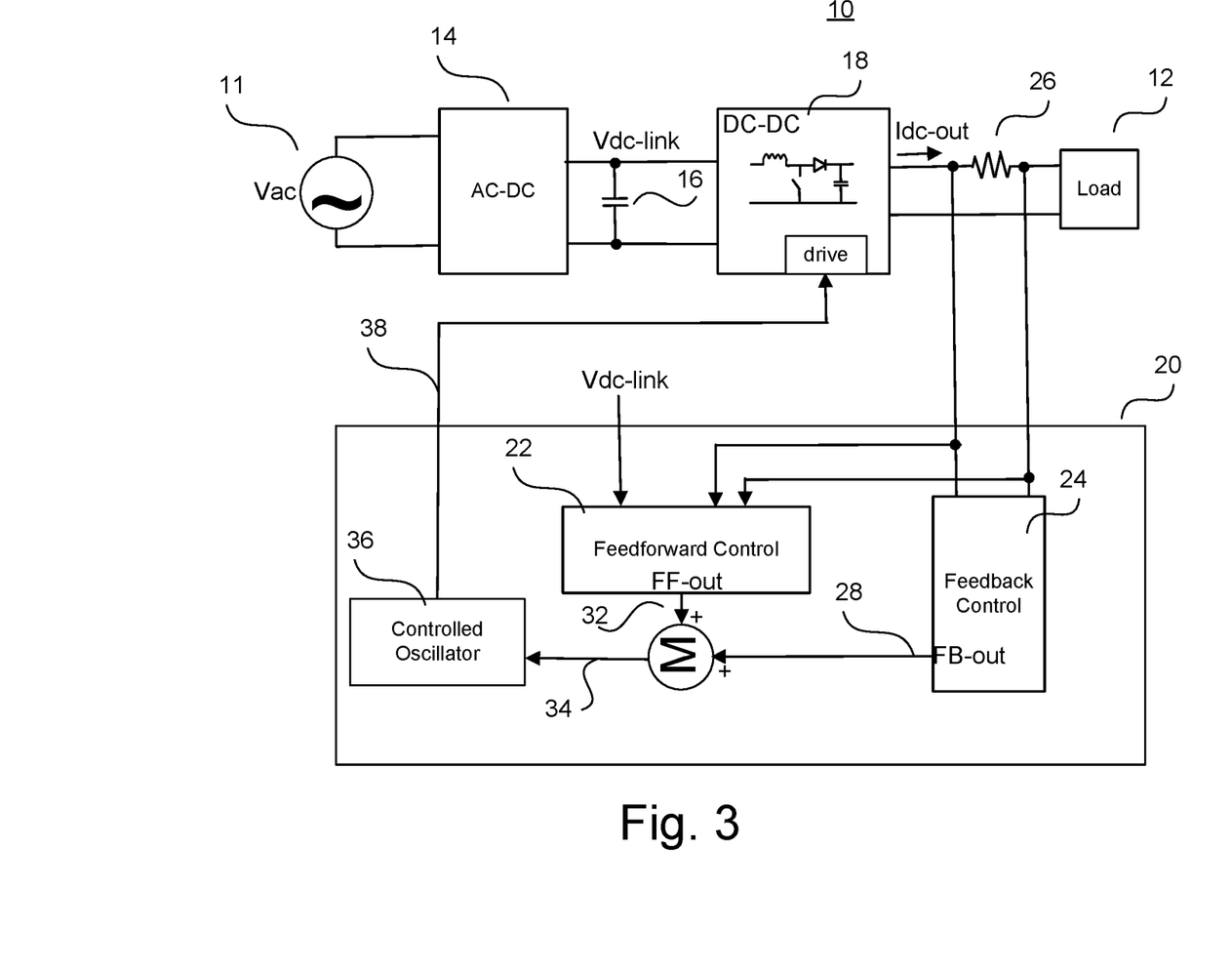
FIG. 3 is a block diagram of a vehicle onboard charging system according to an example embodiment.

FIG. 3 is a charging system 10 according to an example embodiment. Charging system 10 receives an AC voltage from an AC source 10, such as the AC mains, and delivers DC current to a load 12 to be charged. Load 12 may be one or more batteries, capacitors or other devices which store or maintain an electrical charge. When used as an OBC system for an electric vehicle, load 12 may be a plurality of batteries which are used to, among other things, provide propulsion to the motor vehicle.

As shown in FIG. 3, charging system 10 includes an AC-DC converter 14 having input terminals for connecting to the terminals of AC source 11. AC-DC converter 14 converts the AC voltage and current received at its input terminals and generates at its output terminals a DC voltage and current. AC-DC converter 14 may have one of a number of known implementations, and may include an input filter circuit to reduce input noise, a rectifier circuit and a transformer. AC-DC converter 14 employs power factor correction to correct the relative phase of current to voltage in order to provide optimum or otherwise improved power factor such that AC-DC converter 14 may be considered as a power factor correction circuit.

Coupled across the output terminals of AC-DC converter 14 is a DC-link 16. In the illustrated example embodiment, DC-link 16 is at least one capacitor. DC-link 16 provides energy storage during lower input power periods and is recharged in the higher power input power periods of the input power cycle.

A DC-DC converter 18 converts the largely DC output of AC-DC converter 14 and delivers DC power to load 12. As shown in FIG. 3, DC-DC converter 18 includes input terminals which are coupled to the output terminals of AC-DC converter 14. Output terminals of DC-DC converter 18 is coupled to load 12. DC-DC converter 14 converts the DC output of AC-DC converter 14 to the desired DC output level at its output. With charging system 10 being an onboard charging system for a motor vehicle, DC-DC converter 18 is a boost or step-up type converter which provides an increased voltage relative to the voltage appearing at the input terminals of DC-DC converter 18. In other applications, DC-DC converter 18 is a buck or step-down type converter which provides a decreased voltage relative to the voltage appearing at its input terminals. DC-DC converter 18 may have any one of a number of known DC-DC converter implementations. DC-DC converter 18 includes at least one switching element, such as a transistor, which controls operation of the converter, and a drive circuit having an input terminal which receives a control signal appearing at an input control terminal of the converter, and an output terminal which drives the control terminal of the switching element. In one implementation, DC-DC converter 18 includes an inductor, a diode and a capacitor, with the switching element connected in parallel with the series combination of the diode and capacitor, and the inductor coupled between the switching element and an input terminal of the converter.

With continued reference to FIG. 3, charging system 10 further includes a controller 20 which provides feedforward control for use in controlling the output of DC-DC converter 18. Controller 20 includes at least one input terminal coupled across DC-link 16 for receiving the voltage Vdc-link appearing across the DC-link as part of a feedforward control path; one or more input terminals coupled to the output of DC-DC converter 18 as part of a feedback control path; and an output terminal coupled the input terminal of the drive circuit of DC-DC converter 18 for providing a control signal thereto. The feedforward path modifies a control signal generated by the feedback control path for setting the switching frequency of the drive circuit of DC-DC converter 18.

In an example embodiment, the feedback control path of controller 20 is illustrated as a feedback control circuit or block 24. Feedback control circuit 24 receives the signals appearing across a sense resistor 26 which is series connected with load 12, with which feedback control circuit 24 determines the output current Idc-out of DC-DC converter 18. Feedback control circuit 24 may, for example, compare the output current Idc-out of DC-DC converter 18 and/or the ripple current thereof to a predetermined current threshold and generate an error signal 28 at an output terminal of feedback control circuit 24 that is based upon the comparison. Feedback control circuit 24 may be implemented in hardware and may include a voltage comparator circuit. Alternatively, feedback control circuit 24 may be implemented in software instructions executed by a microcontroller, as a field programmable gate array (FPGA), as a state machine, or the like.

In an example embodiment, the feedforward control path of controller 20 is illustrated as a feedforward control circuit or block 22, including at least one input terminal coupled to DC-link 16 for receiving the voltage across DC-link 16. Feedforward control circuit 22 also includes input terminals connected across voltage across sense resistor 26 with which to determine the output current from DC-DC converter 18. Feedforward control circuit 22 may be implemented in software instructions stored in memory which, when executed by a microcontroller or the like, generates a feedforward control signal 32. Alternatively, feedforward control circuit 22 may be implemented as an FPGA or state machine. In an embodiment, feedforward control circuit 22 and feedback control circuit 24 are implemented or otherwise controlled by the same microcontroller which forms at least part of controller 20.

It is understood that controller 20 generates additional control signals not shown in FIG. 3 for controlling the operation of charging system 10, including control signals connected to control input terminals of AC-DC converter 14 for controlling the operation thereof.

As shown in FIG. 3, feedforward control circuit 22 generates feedforward control signal 32 which is combined with feedback control signal 28. In the example embodiment illustrated, feedforward control signal 32 is added to feedback control signal 28 to generate a combined control signal 34. Combined control signal 34 is provided to an input terminal of a controlled oscillator circuit 36, such as a voltage-controlled oscillator circuit. Controlled oscillator circuit 36 may be implemented in any one of a number of well-known voltage-controlled oscillator implementations. The output of oscillator circuit 36 is connected to the input terminal of the drive circuit of DC-DC converter 18 such that control signal 38 generated by controlled oscillator circuit 36 controls the drive circuit. In this way, combined control signal 34 of controller 20 controls the frequency of the output of controlled oscillator circuit 36 which thereby controls the switching frequency of DC-DC converter 18. Instead of controlling and/or modulating the switching frequency, controller 20 may use combined control signal 34 to modulate the duty cycle or the phase shift of switching devices in the drive circuit of DC-DC converter 18, using well known techniques.

Figure 4:
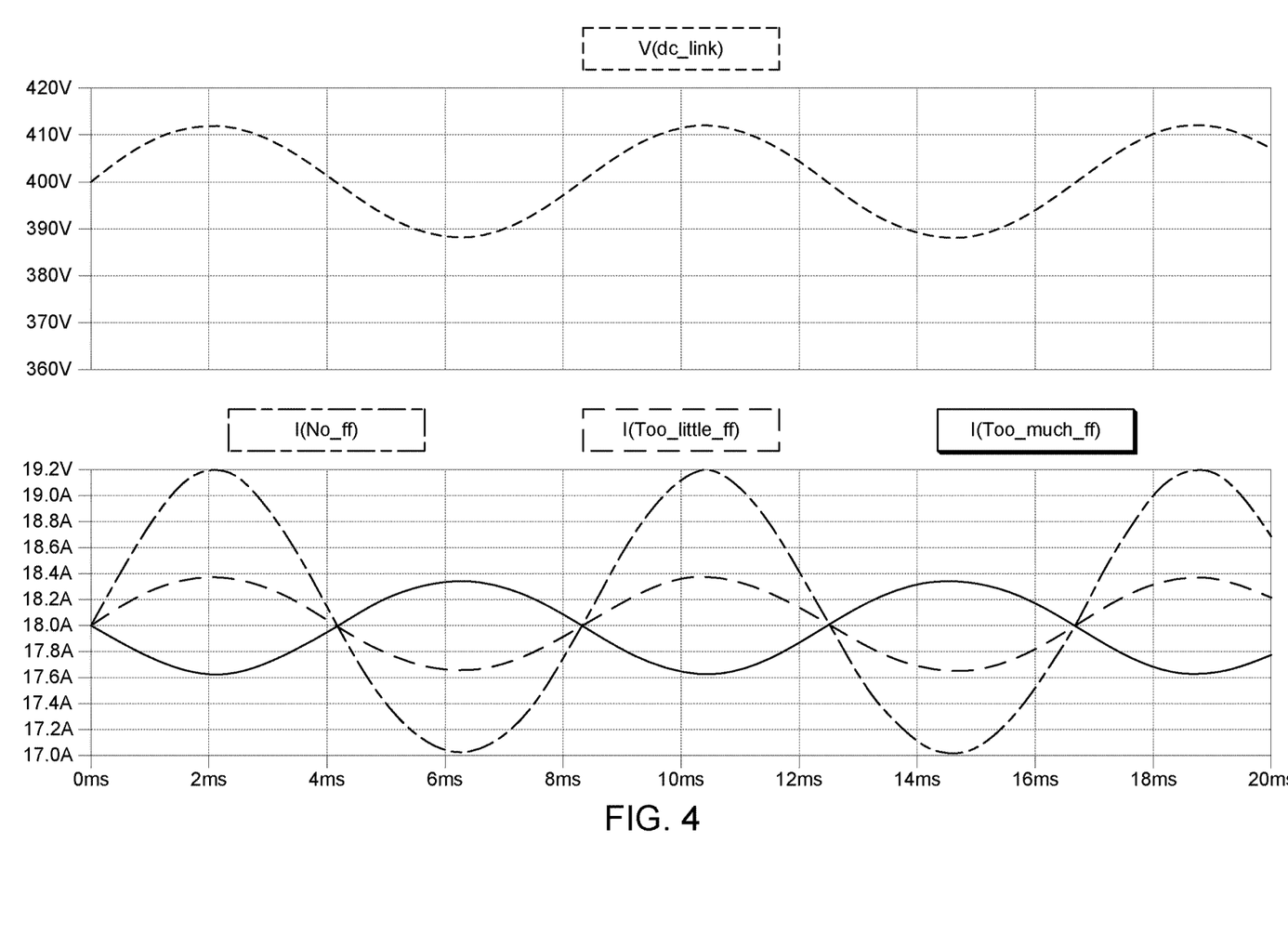
FIG. 4 illustrates waveforms showing a relationship between voltage ripple at a DC-link of a vehicle onboard charging system and feedforward-controlled output current ripple, at different levels of feedforward control.

For a traditional control loop with inadequate ripple rejection, the output current ripple will be roughly in phase and proportional with the DC-Link voltage ripple (FIG. 4), i.e. when input voltage increases, output current also increases. Conversely, when too much feed-forward is applied, the output ripple current will change and be inversely proportional to DC-Link ripple voltage (i.e. when input voltage increases, the output current decreases). This relationship is used to determine if a feedforward coefficient Kff of the feedforward control circuit 22 should be increased or decreased.

Additionally, the amplitude of the output ripple current of DC-DC converter 18 is used to determine how much the feedforward coefficient Kff should be increased or decreased. A large, in-phase current ripple would require a large increase in the feedforward coefficient Kff, a small in-phase current ripple would require a small increase in the coefficient Kff, a small inversely proportional current ripple would require a small decrease in the coefficient Kff, and a large inversely proportional current ripple would require a large decrease in the coefficient Kff.

Feedforward control circuit 22 determines the polarity of the voltage ripple of DC-link 16 by comparing the instantaneous voltage at DC-link 16 with the average voltage thereof. Since the control loop of AC-DC converter 14 has infinite gain at DC, average voltage and setpoint voltage are equivalent and therefore does not need to be calculated. The voltage at DC-link 16 may simply be compared against the setpoint voltage.

A duration of the positive portion and/or half cycle of the ripple voltage at DC-link 16 is determined as the span of time during which the voltage across DC-Link 16 is above the DC-Link setpoint voltage. Similarly, the duration of the negative portion or half cycle of the ripple voltage at DC-link 16 is determined as the span of time during which the voltage across DC-Link 16 is below the DC-Link setpoint voltage. During the positive half cycle of the ripple voltage at DC-link 16, the measured instantaneous output current Idc-out of DC-DC converter 18 is measured against a setpoint current (which is equivalent to the average current) to create a current error signal I_error_pos $$I\_error\_pos=I\_dc\text{-}out-I\_setpoint,$$

Figure 5:
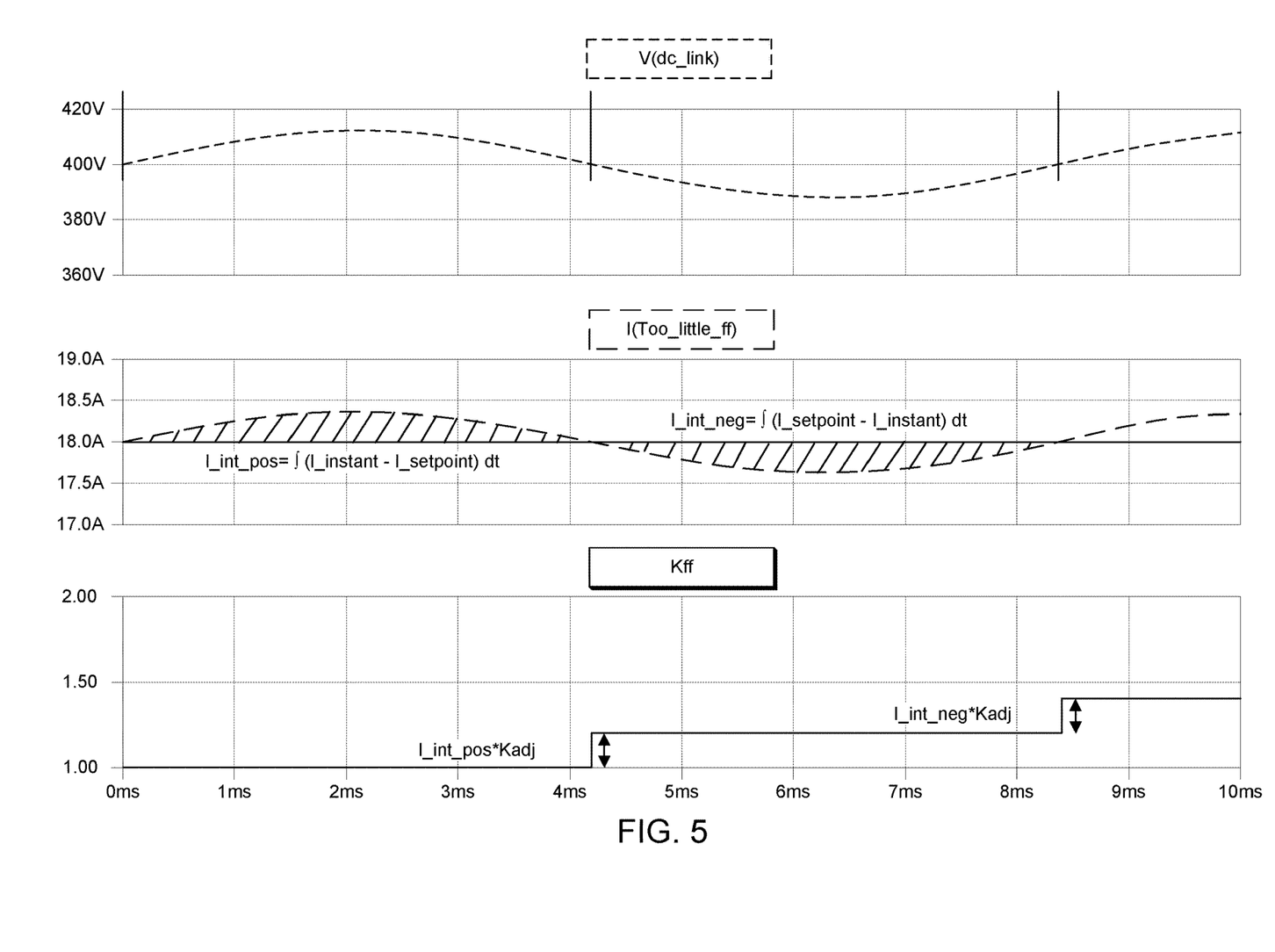
FIG. 5 illustrates waveforms during a first instance of feedforward control of the vehicle onboard charging system of FIG. 2, according to an example embodiment.

Current error signal I_error_pos is integrated over the positive half cycle of the ripple voltage across DC-link 16 by adding each successive measurement to the sum of previous measurements. The result of the integral is the integrated current I_int_pos which is used to proportionally adjust or update the coefficient Kff of the feedforward control circuit 22 as $$\mathit{Kff}\_new=\mathit{Kff}\_prev+I\_int\_pos*\mathit{K}adj,$$

where Kff_new is the adjusted or updated coefficient Kff of feedforward control circuit 22, Kff_prev is the previously adjusted/updated coefficient Kff, and Kadj is a fixed, predetermined value. FIG. 5 illustrates a positive half-cycle and negative half-cycle of the ripple voltage appearing across DC-link 16, during which the instantaneous output current Idc-out of DC-DC converter 18 is largely in-phase with the ripple voltage across DC-link 16, thereby representing there being too little feedforward being applied. Integrating instantaneous current from the positive half cycle results in the integrated current I_int_pos being multiplied by factor Kadj with the result being added to the previously determined coefficient Kff (Kff_prev) to obtain the adjusted, updated feedforward coefficient Kff_new.

In addition, during the negative half cycles of the ripple voltage across DC-link 16, the measured instantaneous output current Idc-out of DC-DC converter 18 is measured against the setpoint current to create a current error signal I_error_neg as $$I\_error\_neg=I\_setpoint-Idc\text{-}out,$$

and integrating current error signal I_error_neg over the negative half cycle of the ripple voltage at DC-link 16 results in integrated current I_int_neg, from which the feedforward coefficient Kff of feedforward control circuit 22 is adjusted and/or updated by $$\mathit{Kff}\_new=\mathit{Kff}\_prev+I\_int\_neg*\mathit{K}adj.$$

As shown in FIG. 5, integrating instantaneous current from the negative half cycle results in the integrated current I_int_neg being multiplied by factor Kadj with the product being added to the previously determined coefficient Kff (Kff_prev) to obtain the adjusted, updated coefficient Kff_new. In this way, the coefficient Kff of the feedforward control circuit 22 is corrected based upon each positive and negative half cycle of the ripple voltage at DC-link 16 until ripple current of the output current Idc-out at the output of DC-DC converter 18 is largely minimized.

Figure 6:
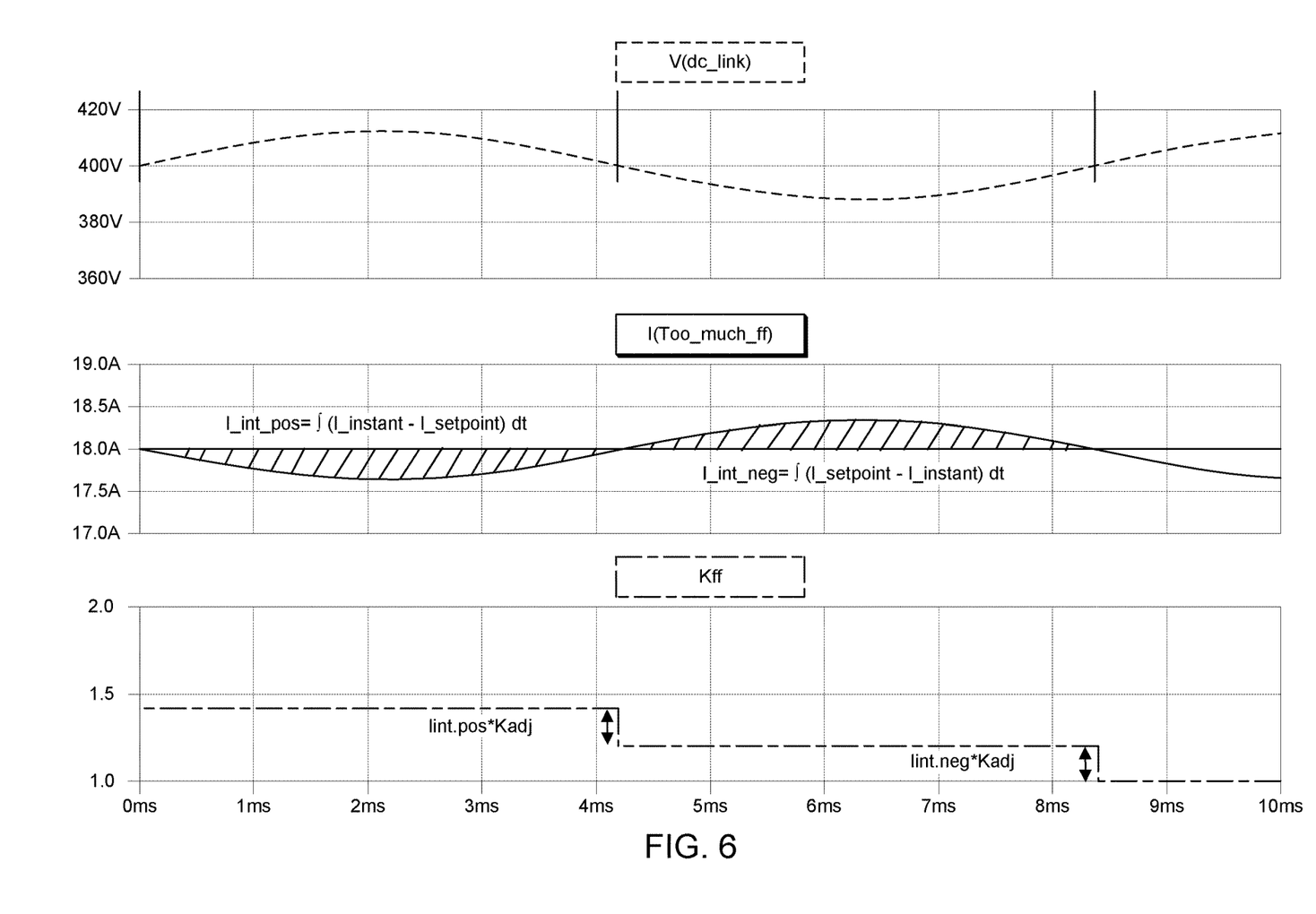
FIG. 6 illustrates waveforms during a second instance of feedforward control of the vehicle onboard charging system of FIG. 2, according to an example embodiment.

FIG. 6 illustrates the positive half-cycle and a negative half-cycle of the ripple voltage appearing across DC-link 16, during which the instantaneous output current Idc-out of DC-DC converter 18 is out of phase with the ripple voltage across DC-link 16, thereby representing there being too much feedforward that has been applied. The integrated currents I_int_pos (during the positive half cycle of the ripple voltage at DC-link 16) and I_int_neg (during the negative half cycle) each results in a decrease of the adjusted, updated feedforward coefficient Kff relative to the corresponding previously-determined feedforward coefficient of Kff (Kff_prev).

Figure 7:
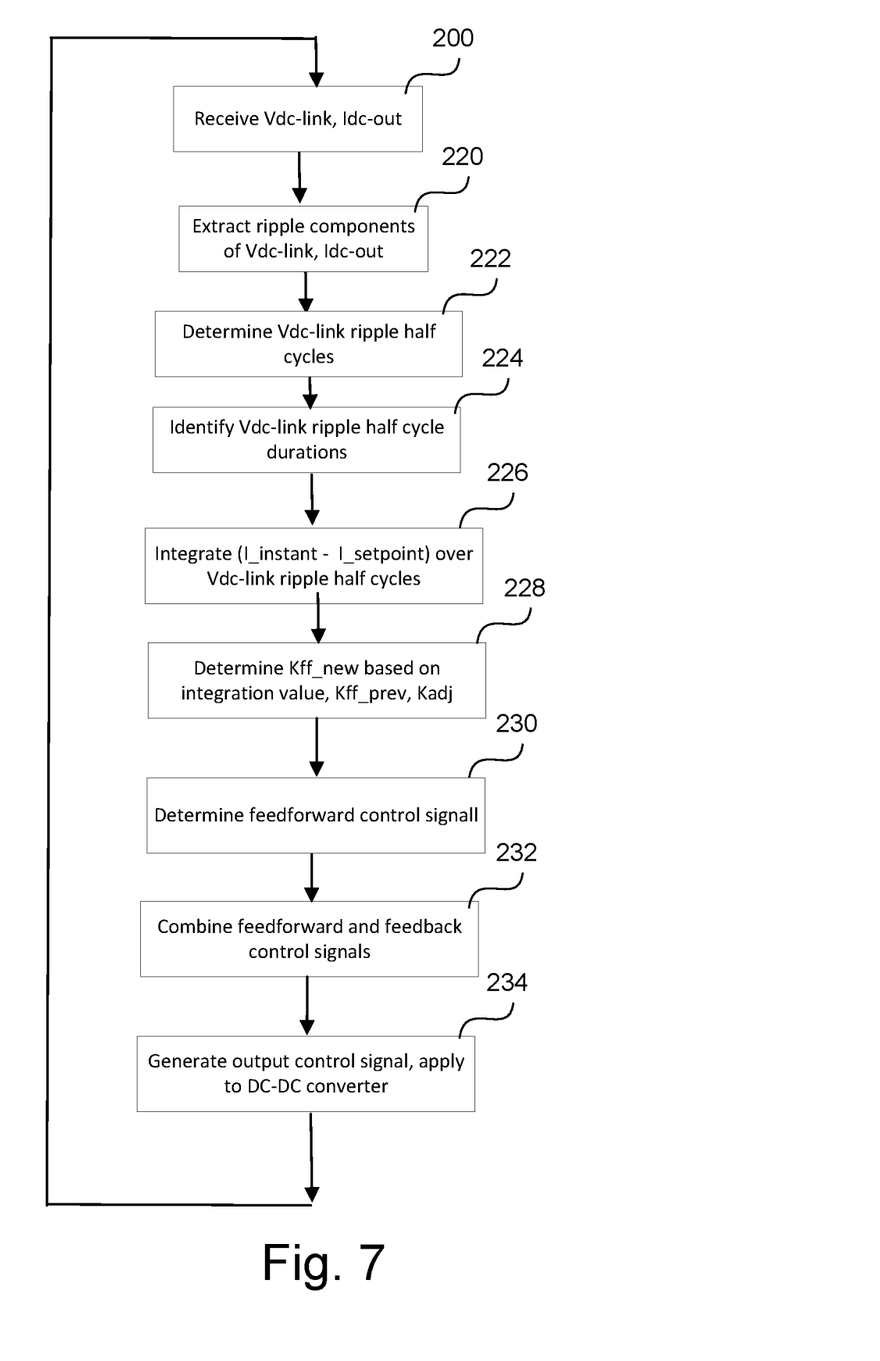
FIG. 7 is a flowchart illustrating an operation of the vehicle onboard charging system of FIG. 3, according to an example embodiment.

FIG. 7 illustrates a flowchart of the operation of feedforward control circuit 22 according to an example embodiment. Initially, the ripple voltage across DC-link 16 is received at 200 as well as the voltage signals across sense resistor 26. The ripple voltage at DC-link 176 and the ripple current at the output of DC-DC converter 18 are determined at 220. The half cycles of the ripple voltage across DC-link 16 are identified at 222, and with that the duration of each positive and negative half cycle is determined at 224. The instantaneous ripple current Idc-out at the output of DC-DC converter 18, after subtracting the setpoint current I_setpoint, is integrated over the corresponding half cycle of the ripple voltage at DC-link 16 at 226. For each half cycle of the ripple voltage at DC-link 16, the integrated current is multiplied by factor Kadj and added to (or effectively subtracted from if the integrated current is a negative value) the previously determined feedforward coefficient Kff_prev to yield the newly adjusted, updated feedforward coefficient Keff_new at 228. The feedforward output control value 32 is determined based upon newly updated feedforward coefficient Keff_new at 230. The feedforward output control value 32 may be determined by. At 232, the feedforward output control signal 32 is combined with the feedback output control signal 28, which generates combined control signal 34 that is used as an input to controlled oscillator circuit 36. Controlled oscillator circuit 36 generates at its output terminal the control signal 38 that is provided to the input terminal of the drive circuit of DC-DC controller 18 at 234.

In an example embodiment, charging system 10 allows for limits to be set for the range of increase and decrease of the feedforward coefficient Kff so that the operation of feedforward control circuit 22 does not use an extreme value of the feedforward coefficient Kff determined during unexpected transients, AC grid disturbances and/or other fault conditions. In addition, charging system 10 may utilize a fail-safe reset of the feedforward coefficient Kff to be a default value if excessive output current error I_error_pos or I_error_neg is detected. Further, a "dead band" for integrated current values I_int_pos and I_int_neg may be implemented so that values below a certain threshold are ignored such that no adjustment or update to feedforward coefficient Kff is made. This effectively disables the feedforward operation once ripple current of Idc_out is within an acceptable limit.

Feedforward control circuit 22 is described above as integrating the current error signal at the output of DC-DC converter 18 and thus adjusting and/or updating feedforward coefficient Kff based upon both the positive and negative half cycles of the ripple voltage at DC-link 16. In an alternative embodiment, feedforward control circuit 22 integrates the current error signal and adjusts feedforward coefficient based upon only the positive half cycles or only the negative half cycles of the ripple voltage at DC-link 16, but not both of the positive and negative half cycles. In another alternative embodiment, feedforward control circuit 22 integrates the current error signal and adjusts feedforward coefficient Kff based upon both the positive and negative half cycles of the ripple voltage, but not in every cycle of the ripple voltage at DC-link 16.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A charging system, comprising:
   an AC-DC converter having input terminals for connecting to AC mains;
   a DC-link having a terminal connected to an output terminal of the AC-DC converter, the DC-link comprising at least one capacitor;
   a DC-DC converter having an input terminal coupled to the output terminal of the AC-DC converter, a control input terminal, and an output terminal for coupling to a load to be charged, the DC-DC converter including drive circuitry for controlling the DC-DC converter; and
   a controller having at least one feedforward input terminal coupled to the DC-link for receiving a signal corresponding to a voltage across the DC-link, at least one feedback input terminal for receiving at least one signal corresponding to an output current provided by the DC-DC converter at the output terminal thereof, and at least one output terminal coupled to the control input terminal of the DC-DC converter, the controller generating a control signal at the at least one output terminal which controls the drive circuitry of the DC-DC converter,
   wherein:
   the control signal generated by the controller is based upon a positive half cycle and a negative half cycle of ripple voltage at the DC-link, and an amplitude of a ripple current at the output terminal of the DC-DC converter during at least one of the positive half cycle or the negative half cycle;
   the controller determines a plurality of error values associated with the ripple current at the output terminal of the DC-DC converter during at least one of the positive half cycle or the negative half cycle in each of a plurality of cycles of the ripple voltage at the DC-link, and adjusts a feedforward coefficient based upon the plurality of error values, the control signal generated by the controller is based upon the adjusted feedforward coefficient, each error value associated with the ripple current at the output terminal of the DC-DC converter is based upon an instantaneous current at the output terminal of the DC-DC converter and a setpoint current value;
   the controller adjusts the control signal based on both the positive and negative half cycles of the ripple voltage at the DC-link, for each cycle of the ripple voltage at the DC-link in a plurality of cycles thereof,
   during the positive half cycle of each of the plurality of cycles, the error value associated with the current ripple at the output terminal of the DC-DC converter comprises the instantaneous value of the ripple current at the output terminal of the DC-DC converter less the setpoint current value, and
   during the negative half cycle of each of the plurality of cycles, the error value associated with the current ripple at the output terminal of the DC-DC converter comprises the setpoint current value less the instantaneous value of the ripple current at the output terminal of the DC-DC converter.

2. The charging system of claim 1, wherein the controller adjusts the control signal based upon the amplitude of the ripple current at the output terminal of the DC-DC converter during both the positive and negative half cycles of the ripple voltage at the DC-link, for each cycle of the ripple voltage at the DC-link in a plurality of cycles thereof.

3. The charging system of claim 1, wherein for each of the at least one of the positive half cycle or the negative half cycle, the controller integrates the error values throughout the at least one of the positive half cycle or the negative half cycle in each of the plurality of cycles.

4. The charging system of claim 3, wherein based upon the integrated error value, the controller adjusts the feedforward coefficient by adding to or subtracting from a previously adjusted version of the feedforward coefficient.

5. The charging system of claim 1, wherein the controller includes a feedforward path from the DC-link and a feedback path from the output terminal of the DC-DC converter, the feedforward path generates a feedforward control signal, the feedback path generates a feedback control signal, and the control signal is based upon the feedforward control signal and the feedback control signal.

6. The charging system of claim 5, wherein the controller combines the feedforward control signal and the feedback control signal to generate a combined control signal, and the control signal which controls the drive circuitry of the DC-DC converter is based upon the combined control signal.

7. The charging system of claim 6, wherein based upon the combined control signal, the control signal modulates switching frequency, duty cycle or phase shift of switching devices in the drive circuitry.

8. The charging system of claim 1, wherein the control signal modulates switching frequency, duty cycle or phase shift of switching devices in the drive circuitry.

9. A method of controlling a DC-DC converter in a charging system including a DC-link coupled to an input of the DC-DC converter, the method comprising:
receiving a voltage at the DC-link and at least one signal representing current at an output terminal of the DC-DC converter;
determining positive and negative half cycles of a ripple voltage at the DC-link, based upon the received DC-link voltage, for a plurality of cycles of the ripple voltage;
determining a plurality of error values associated with a ripple current at the output terminal of the DC-DC converter during at least one of a positive half cycle or a negative half cycle in each of the plurality of cycles of the ripple voltage at the DC-link, for each of the at least one of the positive half cycle or the negative half cycle, integrating the error value associated with the current ripple at the output terminal of the DC-DC converter throughout the at least one of the positive half cycle or the negative half cycle in each of the plurality of cycles, the error value associated with the current ripple at the output terminal of the DC-DC converter is based upon an instantaneous value of the ripple current at the output terminal of the DC-DC converter and an average current at the output terminal of the DC-DC converter, wherein:
determining a plurality of error values comprises determining the plurality of error values associated with a ripple current at the output terminal of the DC-DC converter during each positive half cycle and negative half cycle in each of the plurality of cycles of the ripple voltage at the DC-link,
during the positive half cycle of each of the plurality of cycles, the error value associated with the current ripple at the output terminal of the DC-DC converter comprises the instantaneous value of the ripple current at the output terminal of the DC-DC converter less the average current, and
during the negative half cycle of each of the plurality of cycles, the error value associated with the current ripple at the output terminal of the DC-DC converter comprises the average current less the instantaneous value of the ripple current at the output terminal of the DC-DC converter;
adjusting a feedforward coefficient based upon the plurality of error values associated with the ripple current at the output terminal of the DC-DC converter; and
generating a control signal based upon the adjusted feedforward coefficient and controlling the DC-DC converter using the control signal.

10. The method of claim 9, wherein the error value associated with the current ripple at the output terminal of the DC-DC converter is based upon an instantaneous value of the ripple current at the output terminal of the DC-DC converter and an average current at the output terminal of the DC-DC converter.

11. The method of claim 9, wherein adjusting the feedforward coefficient comprises adding to or subtracting from a previously adjusted version of the feedforward coefficient with the integrated error value.

12. The method of claim 11, further comprising determining a feedforward control signal based upon the adjusted coefficient, and determining a feedback control signal based upon an electrical characteristic at the output of the DC-DC converter, wherein the control signal is generated based upon the feedforward signal and the feedback control signal.

13. The method of claim 9, wherein, the control signal modulates switching frequency, duty cycle or phase shift of switching devices in a drive circuitry of the DC-DC converter.

* * * * *